July 19, 1932. L. DELLOYE 1,867,940
APPARATUS AND METHOD OF MANUFACTURING SHEET GLASS
Filed Dec. 13, 1928
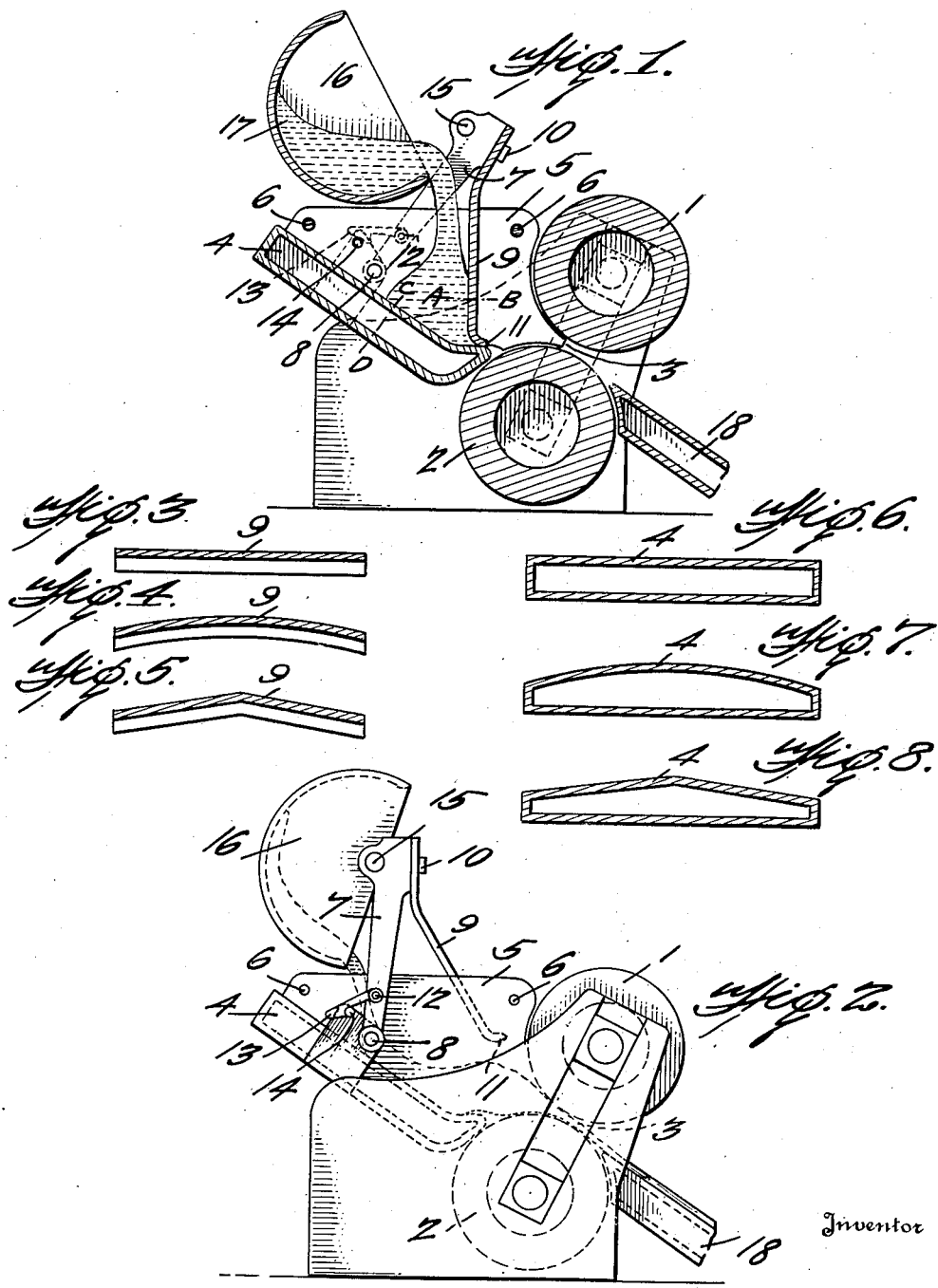

Patented July 19, 1932

1,867,940

UNITED STATES PATENT OFFICE

LUCIEN DELLOYE, OF PARIS, FRANCE, ASSIGNOR TO SOCIÉTÉ ANONYME DES MANU-FACTURES DES GLACES & PRODUITS CHIMIQUES DE SAINT-GOBAIN, CHAUNY & CIREY, OF PARIS, FRANCE

APPARATUS AND METHOD OF MANUFACTURING SHEET GLASS

Application filed December 13, 1928, Serial No. 325,806, and in France December 13, 1927.

In intermittent machines for forming glass sheets now in common use molten glass is generally poured from a pot onto an inclined receiver, having side walls, on which it slides to a forming pass located between rollers placed opposite the lower ends of the receiver. In using such machines the glass in its movement on the receiver is fed to and through the center of the pass before it feeds through the ends thereof, thus producing a rounded front or leading end on the sheet. In a similar manner, when the supply of glass on the receiver is being exhausted, the feed through the ends of the pass ceases before the feed through the center thereof, producing a rounded end on the rear or trailing end of the sheet. These rounded ends must be rejected in cutting the glass to size, with resultant waste.

The object of this invention is to prevent these rounded ends and this I accomplish by the use of certain features and by the method hereinafter described.

I provide a removable dam, preferably in the form of a shutter, across the lower end of the receiver immediately in advance of the forming pass, which dam is retained in place until the glass contacts therewith through the width thereof, after which the dam may be raised to permit the glass to flow uniformly to the pass throughout the width thereof to the scope of forming a flat front of the sheet. The lower edge of the dam may be shaped in such a manner as to check the passage of the glass or to permit it to pass at the sides of the receiver where the glass is colder and therefore more sluggish than in the center of the receiver. The dam or shutter may have a flat glass holding surface, or if it is found desirable, may have such surface convex, in order that the glass fed to the ends of the pass, which is more viscous than the glass at the center of the pass, may have a less distance to travel.

I also may, if desired, give the upper face of the receiver at points remote from the pass, a convex form, so as to facilitate lateral flow of glass on the receiver to increase the glass head adjacent to the ends of the pass, whereby the flow through the ends of the pass will be prolonged to the scope of obtaining square trailing ends on the sheets.

Referring to the accompanying drawing in which corresponding parts are designated by corresponding marks of reference, Figure 1 is a longitudinal vertical section through a forming machine embodying my invention.

Figure 2 is a side elevation thereof.

Figures 3, 4 and 5 are detailed sectional views on the line A—B showing different shapes that may be given the dam, and Figures 6, 7 and 8 are similar views in vertical section on the line C—D showing the different contours that may be given the glass supporting surface of the receiver.

The forming machine, shown in the drawing, includes the usual rolls 1 and 2, having a forming pass 3 between them, located opposite the lower end of an inclined glass receiver 4, and cheek pieces 5, the distance between the latter determining the length of the forming pass and the width of the sheet. The cheeks may be tied together by transverse bars 6.

In carrying out my invention I preferably make the upper surface of the glass receiver near the higher end thereof convex in transverse section. This may be done by curving it as shown in Fig. 7, or by forming it with two plane faces meeting at an angle in the middle line of the receiver, as shown in Fig. 8. If this is done the surfaces are so warped that such upper face is substantially flat at its lower end adjacent to the forming pass, with which it is parallel. If desired the whole surface of the receiver may be plane in transverse section, as is shown in Fig. 6.

In carrying out my invention I preferably construct the dam in the form of a shutter 9 mounted for movement towards and from the receiver immediately in advance of the forming pass, the shutter fitting between the cheek pieces 5. The shutter may be either flat in section from side to side, as shown in Fig. 3, or convex away from the pass, either with a continuous curve as shown in Fig. 4, or with intersecting faces, as shown in Fig. 5.

The shutter may for convenience be mounted by bolts 10 on each side at its top on arms 100

7, pivoted to the receiver frame at 8. By preference the arms 7 are provided with means such as perforations 15, by which they may be turned on their pivots to lift the shutter, and the arms 7 are provided with latches 13 pivoted at 12, adapted when the shutter is raised to engage a pin 14 on the cheek piece 5 to hold the shutter up.

In the use of a forming machine constructed in accordance with this invention, the shutter is lowered as shown in Fig. 1, before the glass is poured on the receiver from a pot or ladle 16. As shown in Fig. 1, the first pouring of the glass 17 is immediately adjacent to the shutter and when the glass so poured has spread the full width of the table the shutter is raised until the latches 13 engage the pins 14 and hold the shutter in its elevated position. The lifting of the shutter releases the glass, which was dammed up by it to flow to the pass. As the crest of the dammed up glass is close to the forming pass and preferably immediately adjacent to the line where the surface of the forward upper quadrant of the lower roll 2 starts its drag on the glass, the arrival of the glass is practically simultaneous throughout the length of the pass, thus avoiding the formation of a rounded leading end on the sheet when formed. As the glass at the sides of the receiver is generally more viscous, there may be under some circumstances, even when the shutter is used, a lag in the arrival of the glass at the ends of the pass, and this may be corrected by using a convex face on the shutter as shown in Figs. 4 and 5, whereby the crest of the dammed up glass is given a crescent shape, with the ends of the crest closer to the pass than is its center, to compensate for the greater viscosity at the ends.

The pouring continues, as the glass thus initially poured flows to the pass, and as shown in Fig. 2, the final pouring due to the tilting of the ladle is on the higher end of the receiver. If the surface of that portion is convex as shown in Figs. 7 and 8, the glass tends to feed not only directly towards the pass, but towards the sides of the receiver, and hence towards the ends of the pass. This increases the head serving to feed such ends, and to thus prevent the formation of a rounded trailing end on the sheet.

When the glass on the receiver has fed to the pass, the latches 13 may be disengaged, allowing the shutter to again drop, when the operation may be repeated.

Having thus described my invention, what I claim is:

1. In a glass forming machine the combination with a pair of rolls, with a sheet forming pass between them, of an inclined glass receiver adjacent to the forming pass and feeding glass thereto, and a removable dam above the receiver and located in advance of the pass and adjacent thereto, the lower edge of the dam being convex.

2. In a glass forming machine the combination with a pair of rolls, with a sheet forming pass between them, of an inclined glass receiver adjacent to the forming pass and feeding glass thereto, and a removable dam above the receiver and located in advance of the pass and adjacent thereto, the upper surface of the receiver at a plane remote from the forming pass being convex transversely, and being plane adjacent to the pass.

3. In a glass forming machine the combination with a pair of rolls, with a sheet forming pass between them, of an inclined glass receiver adjacent to the forming pass and feeding glass thereto, the upper surface of the receiver at a point remote from the forming pass being convex transversely, and a removable dam above the receiver and located in advance of the pass and adjacent thereto.

4. In a glass forming machine the combination with a pair of rolls, with a sheet forming pass between them, of an inclined glass receiver adjacent to the forming pass and feeding glass thereto, the upper surface of the receiver at a point remote from the forming pass being convex transversely, and a removable dam above the receiver and located in advance of the pass and adjacent thereto, the face of the dam away from the pass being convex.

5. In a glass forming machine the combination with a pair of rolls having an inclined sheet forming pass between them, of a glass receiving surface adjacent to the forming pass and feeding glass thereto, the upper surface of the receiver at a plane remote from the forming pass being convex transversely, while adjacent to the forming pass the receiving surface has a plane surface.

6. The hereinbefore described method of feeding glass to the forming pass of an intermittent sheet glass forming machine, which comprises pouring glass on an inclined receiver, damming the flow of glass from the receiver to the pass until the glass has spread across the receiver, and then removing the dam.

7. The hereinbefore described method of feeding glass to the forming pass of an intermittent sheet glass forming machine, which comprises pouring glass on an inclined receiver, creating a concave front wall of glass on the receiver by damming the flow of glass from the receiver to the pass until the glass has spread across the receiver, and then removing the dam.

8. In an intermittent glass forming machine the combination with a pair of rolls, with a sheet forming pass between them, of an inclined glass receiver adjacent to the forming pass and feeding glass thereto, and removable dam above the receiver and located in advance of the pass and adjacent hereto, with means for lowering the dam on the receiver in order to check the flow of glass poured on the receiver until the glass contacts with the dam through the width thereof and for raising the dam out of contact with the glass to permit the glass to flow freely to the forming pass, the face of the dam away from the forming pass being convex to permit the glass to spread more quickly to the lateral ends of the dam while lowered on the receiver.

LUCIEN DELLOYE.